United States Patent
Frantz

[11] Patent Number: 5,809,691
[45] Date of Patent: Sep. 22, 1998

[54] WATERING BELL

[76] Inventor: James L. Frantz, 2185 Brittany Dr., Mobile, Ala. 36695

[21] Appl. No.: 790,435

[22] Filed: Jan. 29, 1997

[51] Int. Cl.$^6$ .................................................... A47G 7/02
[52] U.S. Cl. ............................................. 47/40.5; 47/48.5
[58] Field of Search .................................. 47/40.5, 48.5; 138/109, 118, 177, 178

[56] References Cited

U.S. PATENT DOCUMENTS

| | | | |
|---|---|---|---|
| Re. 28,095 | 7/1974 | Chapin | 138/118 X |
| 2,750,232 | 6/1956 | Szantay et al. | 138/118 X |
| 2,753,215 | 7/1956 | Barr | 138/118 X |
| 2,938,304 | 5/1960 | Thomas et al. | 47/40.5 X |
| 4,021,965 | 5/1977 | Norris | 47/48.5 |
| 4,753,394 | 6/1988 | Goodman | 47/48.5 X |
| 4,850,137 | 7/1989 | Foster | 47/40.5 X |
| 5,106,235 | 4/1992 | King | 138/118 X |
| 5,267,412 | 12/1993 | Bergin | 47/48.5 |
| 5,349,997 | 9/1994 | Rial | 141/331 |
| 5,410,839 | 5/1995 | Granger | 141/331 |
| 5,473,838 | 12/1995 | Denbigh | 141/331 |
| 5,493,277 | 2/1996 | Pierce et al. | 141/331 |

FOREIGN PATENT DOCUMENTS

| | | | |
|---|---|---|---|
| 191693 | 12/1906 | Germany | 47/48.5 |
| 202146 | 9/1907 | Germany | 47/48.5 |

*Primary Examiner*—John A. Ricci
*Attorney, Agent, or Firm*—Patent & Trademark Services; Joseph H. McGlynn

[57] ABSTRACT

A device for the irrigation of trees, both at the stand and lower trunk and branch areas of the tree. The device is composed of a decorative upper bell/funnel which can be mounted anywhere in a tree, a connected hose, and a lower bell/funnel connected to the other end of the hose. The upper funnel acts as a decorative object on the tree, while the lower funnel is placed concave down in the stand of the tree. The hose connecting the two funnels has a plurality of small holes along its length, and is attached to the trunk of the tree. In use, the user fills the upper funnel with water, which then travels through the hose towards the lower funnel located in the tree's stand. Some water dissipates from the small holes in the hose, thereby providing water for the trunk and lower branches, while the rest of the water exits the hose at the lower funnel into the stand, providing water for the tree to consume at a later time.

6 Claims, 1 Drawing Sheet

WATERING BELL

BACKGROUND OF THE INVENTION

This invention relates generally to plant and tree watering devices and, more particularly, to watering devices for mounted Christmas type trees.

DESCRIPTION OF THE PRIOR ART

Numerous inventions relating to tree watering devices have been proposed in the prior art. Often, they seek to enable users to water trees mounted in stands from a distance. U.S. Pat. No. 5,349,997 discloses a portable and highly efficient method for filling watering stands of inside trees. The invention is made up of approximately four sections of loosely fitting tubing sections with an angular set funnel at the top, which are held together with a tensioned inside elastic cord, and which can be placed downward through the limbs of an inside tree to quickly feed water from the funnel to the watering stand with a siphon effect generated by the moving water in the full length assembled tubing.

U.S. Pat. No. 5,410,839 discloses an apparatus for maintaining a water supply in a stand supporting a Christmas tree, with a rigid funnel body comprising integrally formed top, center, and bottom portions. The funnel has a frusto-conical cross-section that tapers from the top portion to the bottom portion. A float assembly is pivotally affixed to the bottom portion of the funnel and is coupled to the light assembly with a connecting member. The float assembly includes a float body that floats on the surface of the water supply to induce movement of the connecting member for energizing the light source.

U.S. Pat. No. 5,473,838 discloses a device for conveying irrigation water to a Christmas tree stand fluid bowl. The inventive device includes a funnel securable to a branch of the tree. A tubular conduit extends from the funnel along the tree trunk and terminates within the fluid bowl without requiring an individual to directly access the fluid bowl.

U.S. Pat. No. 5,493,277 discloses a Christmas tree ornament using a water sensor that provides on demand an indication by light and/or sound if the tree needs water. A portion of the ornament contains a funnel side which allows water to be added to the tree. The other portion of the ornament contains the circuitry for the sensor. A sensor, in the form of a pair of electrodes or terminals, connected to the circuitry, is contained in the water of the Christmas tree stand. In operation, when the switch is turned on, the green light is energized indicating that the battery is good (a safety feature). If the red light is not on, it is an indication the tree needs water. Water can be added through the funnel side of the ornament.

Most of the prior art inventions have aimed only to allow irrigation of the stand area of a Christmas-type tree. There remains a need for a device which can provide water to other areas of the tree, such as the trunk and lower branches, while still allowing the convenience of irrigation from a distance.

SUMMARY OF THE INVENTION

The present invention is a means for the irrigation at a distance of Christmas-type trees and other trees, both at the stand and lower trunk and branches areas of the tree. The invention is composed of a decorative upper bell/funnel which can be mounted anywhere in a normal tree, a connected hose, and a lower bell/funnel connected to the other end of the hose. The upper funnel acts as a decorative object on the tree, while the lower funnel is placed concave down in the stand of the tree. The hose connecting the two funnels has a plurality of small holes along its length, and is attached to the trunk of the tree. In use, the user fills the upper funnel with water, which then travels through the hose towards the lower funnel located in the tree's stand. Some water dissipates from the small holes in the hose, thereby providing water for the trunk and lower branches, while the rest of the water exits the hose at the lower funnel into the stand, providing water for the tree to consume at a later time.

Accordingly, it is an object of this invention to provide a means for watering a tree that allows water to be placed in the stand of the tree without the user crawling under the tree.

It is a further object of this invention that the means for watering be contained in a decorative apparatus which may be attached to the tree on a semi-permanent basis.

Finally, it is an object of this device that the watering process also provide water and moisture to the trunk and lower branches with the same level of convenience.

DESCRIPTION OF THE PREFERRED EMBODIMENT

Figure 1:
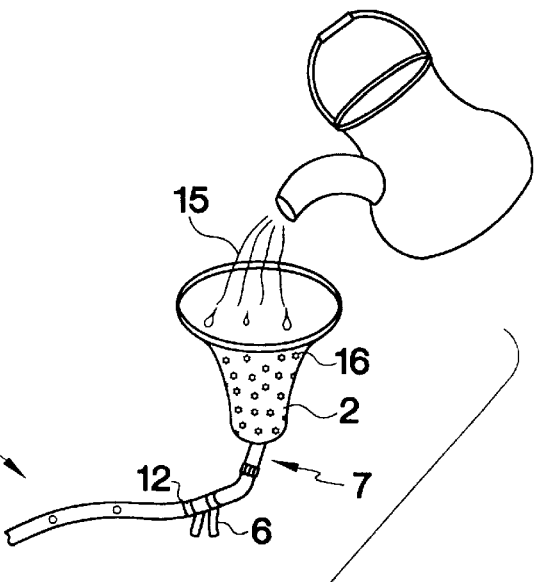
FIG. 1 shows a perspective view of the invention as water is distributed through it.

Referring now to the drawings, there is shown in FIG. 1 the present invention 1 comprising an upper and lower funnel piece 2, 3 connected by a length of tubing 4, which has in it a plurality of small holes 5. The upper funnel piece 2 is painted and/or decorated at 16 so that it resembles any normal bell-shaped ornament used to adorn a Christmas-style tree. Other types of decorations for other types of trees can also be used.

The length of tubing 4 is connected at both ends to the funnel pieces 2, 3 by friction fitting the tubing 4 to a projection 7, 8 at the smaller end of the funnel pieces 2, 3. The projection 7, 8 is hollow and emanates perpendicularly from the hole at the small end of the funnel pieces 2, 3 so that any liquids poured into the funnel will pass through the projections 7, 8. The tube 4 is of a slightly larger size than the funnel projection 7 of the upper funnel piece 2 so that the tube 4 may fit over the projection 7, and is held in this position by any conventional tying pieces 12. The projection 8 of the lower funnel 3 is slightly larger than the tube 4 so that the tube 4 may fit inside of the projection 8, and be held in this position by means of the frictional forces between the tube 4 and the projection 8. In this manner, the funneled pieces 2, 3 are connected so that liquids may be introduced into the upper piece 2 and then travel to the lower piece 3 via the tubing 4. Of course the upper hose connection may be a friction fit as is the case of the lower hose connection, or the lower hose connection may be secured by ties 12.

Figure 2:
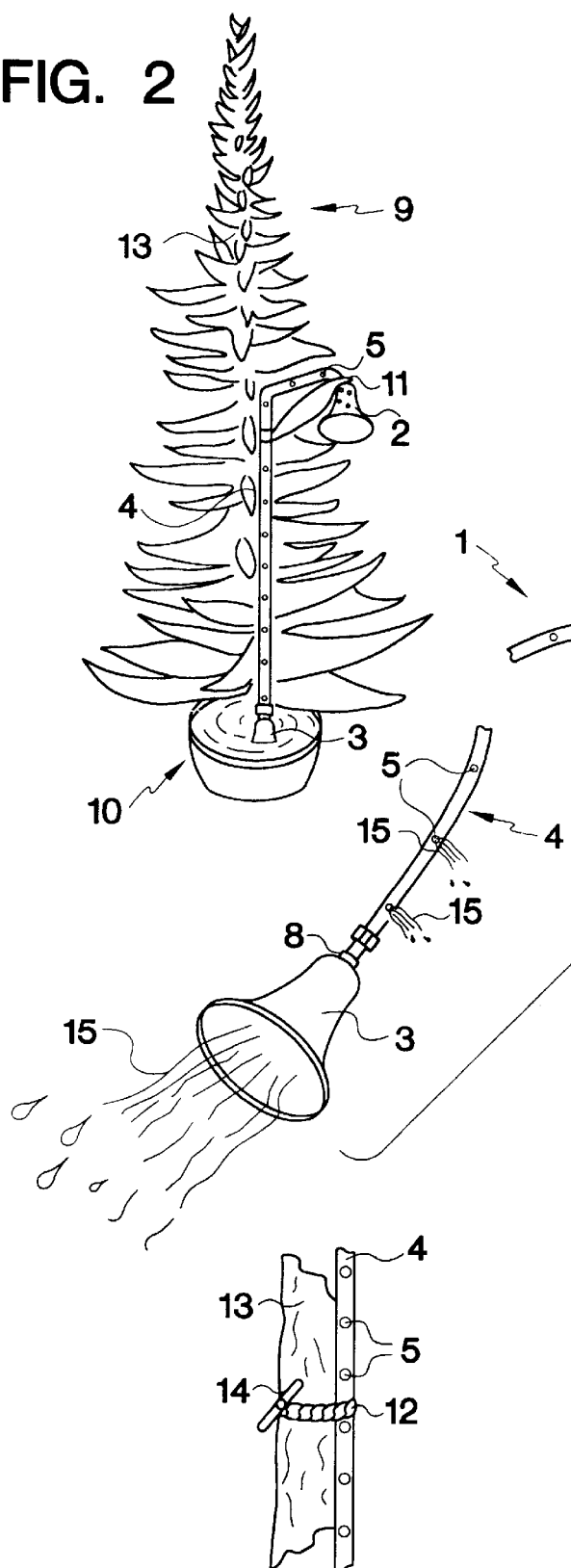
FIG. 2 shows a perspective view of the device as it is mounted in a tree for use.
Figure 3:
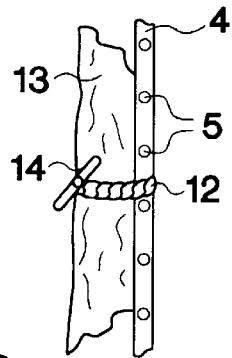
FIG. 3 shows an enlarged side view of the tying device used to connect the tubing to the tree.

In use, the device is mounted inside any normal tree 9 that is mounted in a normal stand 10, such as those used for Christmas-style trees, as shown in FIG. 2. The device is oriented so that the upper funnel piece 2 is at the edge of a branch or limb 11 of the tree 9 in a concave down position, with its decorations 16 making it visually pleasing, and so that the lower funnel piece 3 is placed inside the stand 10 in a concave down position. The device is secured in the aforementioned position by a plurality of tying pieces 12 that holds the tubing 4 to the tree 9, both at the trunk 13 and at limbs 11, as shown in FIG. 3. The tying pieces 12 are placed so that the tube 4 is held parallel to the trunk 13, and are secured in such a position by the twisting of the two ends 14 of the tying piece 12, as with any conventional tying piece. These tying pieces 12 are located throughout the length of the device at the user's discretion to assure that the device will be held in this position.

With the device properly mounted, the upper funnel piece 2 is turned in a concave up position, and water 15 is poured into it. The water passes through the funnel piece 2 and into the tubing 4, proceeding to the lower funnel piece 3, where it is then deposited in the stand 10 at the base of the tree 9, thereby replenishing the water supply of the tree 9. The holes 5 in the tubing 4 allow some of the water 15 deposited in the upper funnel piece 2 to escape from the tubing 4, thus providing irrigation to the lower limbs 11 and trunk 13 of the tree.

Figure 4:
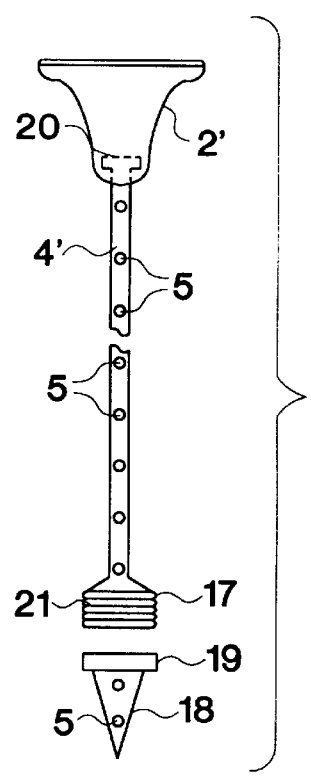
FIG. 4 shows a second embodiment of the present invention.

FIG. 4 shows a second embodiment of the invention. The watering bell of FIG. 4 has a bell shaped ornament 2' similar to ornament 2 in FIG. 1, into which water may be poured. Connected to ornament 2' is a length of hose 4' which is connected to ornament 2' by any conventional swivel connector 20. The tube has apertures 5 which perform the same function as the apertures 5 in FIG. 1. Connected to the bottom of the hose is a flanged connector 17 which has external threads 21 thereon. If the tree to be watered needs only surface watering, the connector 17 is pushed into the soil around the tree and water is poured through the ornament 2'. If the tree needs water closer to the roots, the pointed adapter 18 which has internal threads (not shown) in flange 19 is threaded onto connector 17 and the adapter 18 is pushed as far down into the soil as possible. The pointed end of adapter 18 makes pushing the adapter into the soil easier.

The construction and manufacture of the device employs a number of techniques and materials. The tubing 4 used in the device is made of any standard clear plastic tubing which has been manufactured using the plastic extrusion process.

The plastic extrusion process is one whereby molted, heat softened plastic is forced under high pressure through a die, similar to toothpaste being squeezed through the hole in the top of the tube, (in this example the hole in the tube is the die). The plastic forms a continuous length in the shape of the die it was squeezed through. In other words, the plastic would come out continually in the shape of the rod using the nozzle as a die. In this case, the plastic extrusion would take on the shape of the tubing.

The funnel pieces 2, 3 may be manufactured of plastic using either injection molding or thermoforming.

Injection molding is a plastic molding procedure whereby heat softened plastic material is forced under very high pressure into a metal cavity mold which is relatively cool. Acceptable metals for the mold are aluminum and steel. The inside cavity of the mold is comprised of two or more halves, and is the same desired shape as the product to be formed. High pressure hydraulics are used to keep the mold components together during the actual injection phase of the molding process. The injected plastic is allowed to cool and harden. The hydraulics holding the multiple component cavity together are released, the halves of the mold are separated and the solid formed plastic item is removed. Injection molding can be a highly automated process and is capable of producing extremely detailed parts at a very cost effective price.

Thermoforming is a plastic forming procedure which uses heat softened sheet plastic. The softened plastic is forced by pressure into or onto a mold surface. The mold surface is the desired shape of the product to be formed. Once the sheet plastic has been formed into the desired shape, it is allowed to cool and harden. The formed part, in this case, the funnel pieces 2, 3, is then removed, trimmed, and additional holes or slots are machined into the component as a second stage manufacturing process. This process will produce a funnel which looks good but will not produce extreme detail. The tooling for this process is usually not as expensive as the tooling used for injection molding processes. The above mentioned manufacturing processes are merely for illustration purposes, and other methods may be employed without departing from the scope of the invention.

The tying members 12 are any conventional tie pieces which have a metal piece component that runs the length of the tie, giving it strength and allowing it to be held in a twisted position.

Although the tree-watering device and the means of using the same according the present invention have been described in the foregoing specification with considerable detail, it is to be understood that modifications may be made to the invention which do not exceed the scope of the appended claims, and modified forms of the present invention done by others skilled in the art to which the invention pertains will be considered infringements of the invention when those modified forms fall within the claimed scope of this invention.

What I claim as my invention is:

1. A tree watering device comprising:

a first container having sides, an open top and an open bottom, said open bottom having a hollow projection connected thereto, a tube having one end connected to said projection, a second container having sides, an open top and an open bottom, said open top having a hollow projection connected thereto, another end of said tube connected to said projection on said second container, and a plurality of apertures spaced along said tube, and wherein said open top on said first container is larger than said open bottom.

2. The tree watering device as claimed in claim 1, wherein said open top on said second container is smaller than said open bottom.

3. The tree watering device as claimed in claim 1, wherein said device has tie means for attaching said tube means to a trunk of a tree.

4. The tree watering device as claimed in claim 1, in combination with a tree and in which said tree is placed in a third container, and wherein said first container is attached to a branch of said tree, and said second container is positioned adjacent said third container.

5. A tree watering device comprising:

a container having sides, an open top and an open bottom, a tube having one end connected by a swivel joint to said open bottom, a connector attached to an other end of said tube, said connector having sides, an open top and an open bottom, said connector having external threads, a plurality of apertures spaced along said tube.

6. A tree watering device as claimed in claim 5 wherein an adapter is attached to said connector, said adapter having a tapered end and apertures spaced therealong.

* * * * *